United States Patent

[11] 3,598,254

| [72] | Inventor | Robert F. Meisoll |
| | | Henrico County, Va. |
| [21] | Appl. No. | 763,101 |
| [22] | Filed | Sept. 27, 1968 |
| [45] | Patented | Aug. 10, 1971 |
| [73] | Assignee | AMF Incorporated |

[54] PAN FEEDING APPARATUS
8 Claims, 12 Drawing Figs.

[52] U.S. Cl. .................................................. 214/8.5 A,
214/8.5 C
[51] Int. Cl. ...................................................... B65g 59/02
[50] Field of Search .......................................... 214/8.5 A,
8.5 C, 8.5, 1 B

[56] References Cited
UNITED STATES PATENTS

| 3,101,851 | 8/1963 | Heide | 214/6 (H) |
| 2,993,609 | 7/1961 | Enterline | 214/8.5 (A) X |
| 3,416,679 | 12/1968 | Stobb | 214/8.5 (A) |
| 3,429,466 | 2/1969 | Puderbach | 214/8.5 (C) X |

Primary Examiner—Gerald M. Forlenza
Assistant Examiner—George F. Abraham
Attorneys—George W. Price and Barry H. Fishkin ABSTRACT: Pan feeding apparatus comprising means for supporting a stack of pans, means for raising said support means to a position whereat the topmost pan is at a predetermined height, means for lifting said topmost pan from the stack and transporting it to a position spaced from a collection area, means for maintaining the topmost pan of the stack at said predetermined height as the pans are removed therefrom and means mounted adjacent said predetermined height for engaging and supporting the last few pans of said stack independently of said support means.

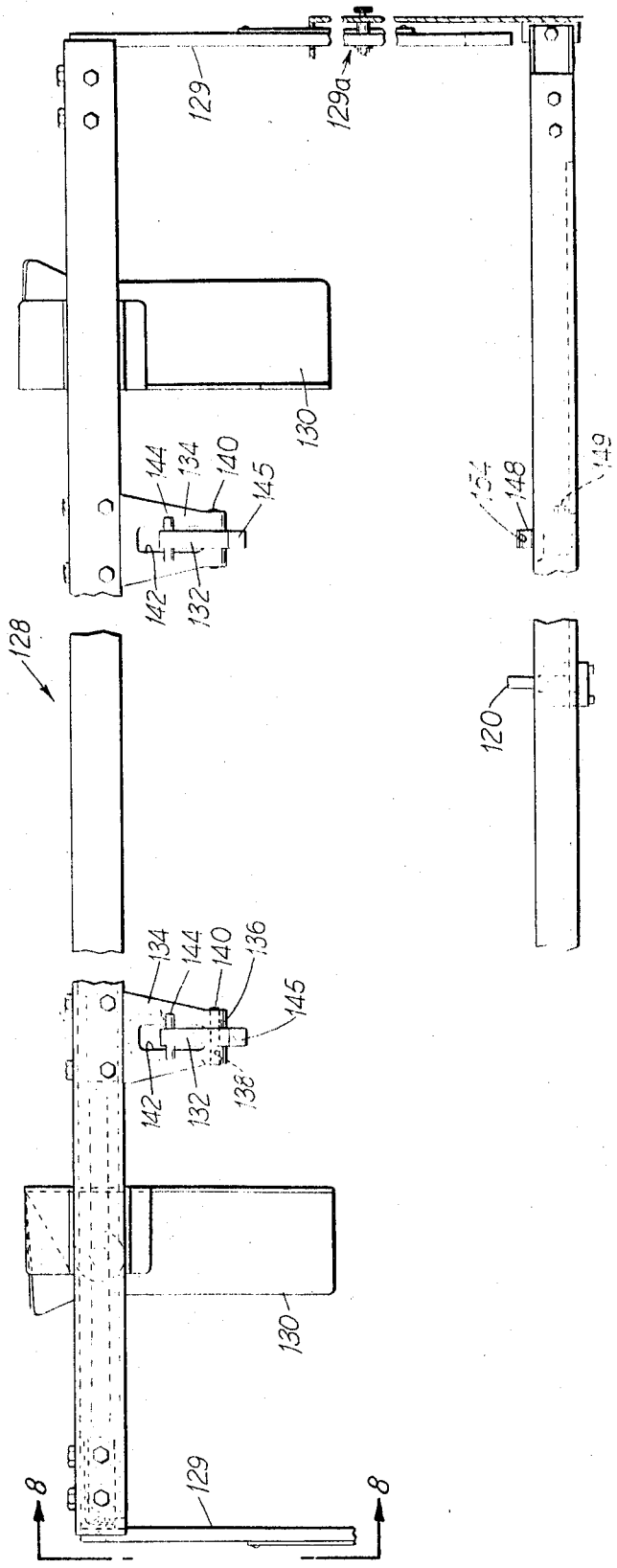

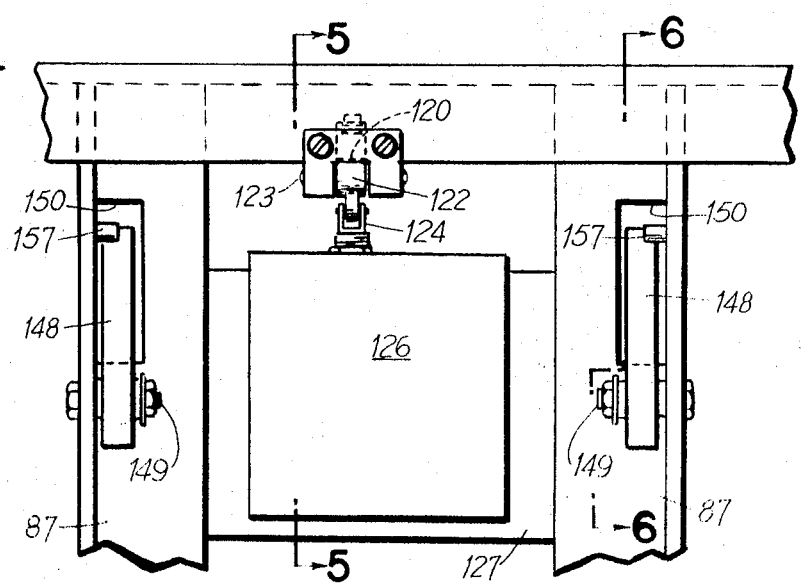
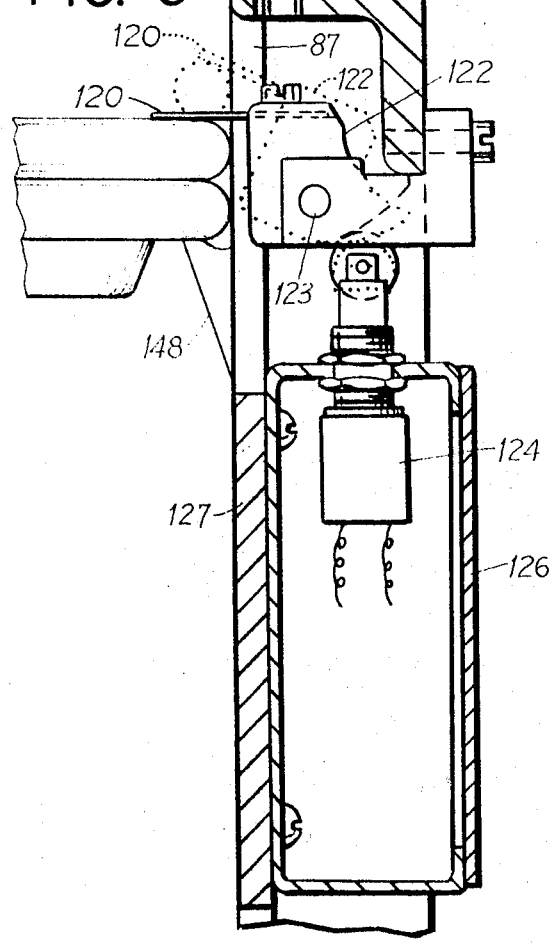
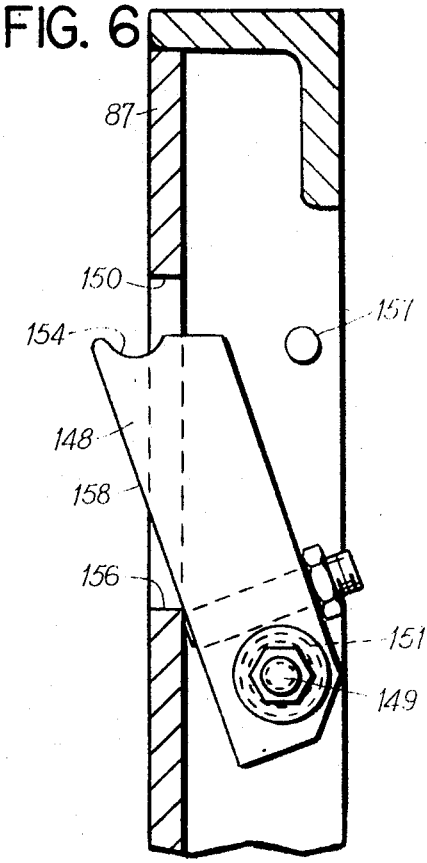

3,598,254

PAN FEEDING APPARATUS

BACKGROUND

This invention relates to materials handling and more particularly to the automatic feeding of pans one at a time from a stack.

In the baking industry there are several processes and/or operations that require a flow of pans. Smooth working of these operations and processes requires that the pan flow be uninterrupted, consistent and reliable. Prior art pan feeding means failed to provide one or more of these requirements and thus the taking of full advantage of automatic machinery was precluded.

Typical of the shortcomings presented by prior art pan feeding apparatus was the necessity of interrupting the operation thereof to replenish the supply of pans therein, the necessity of adapting the operation of the apparatus to a changing height of the stack of pans, which forms the supply as they are withdrawn and the need to improve the pan release mechanism to assure that each pan is dropped in the same place and in proper orientation.

SUMMARY

It is therefore, an object of this invention to provide apparatus for continuously feeding pans one at time from a stack.

It is another object of this invention to provide apparatus for feeding pans from a stack thereof including means for maintaining continuity of the feeding operation when the stacks are depleted.

It is further object of this invention to provide apparatus for maintaining the level of a stack of pans constant as pans are removed therefrom.

It is a still further object of this invention to provide an improved pan release mechanism.

It is yet another object of this invention to provide an improved pan supply delivery and support apparatus.

In accordance with these and other objects, the invention comprises means for supporting and elevating a stack of articles to a predetermined height, means for withdrawing articles one at a time from the top of the stack and means for supporting the last few articles adjacent the predetermined height when the elevating and supporting means is withdrawn.

DESCRIPTION OF THE DRAWINGS

FIG. 3 is a plan view of the pan accumulator assembly of the apparatus.

FIG. 4 is a partial elevation view of the apparatus taken along the line 4–4 of FIG. 1.

FIG. 5 is a partial sectional view of the apparatus taken along line 5–5 of FIG. 4.

FIG. 6 is a partial sectional view of the apparatus taken along line 6–6 of FIG. 4.

FIG. 8 is a elevation view of the apparatus taken along line 8–8 of FIG. 3.

DESCRIPTION OF THE PREFERRED EMBODIMENT

Figure 1:
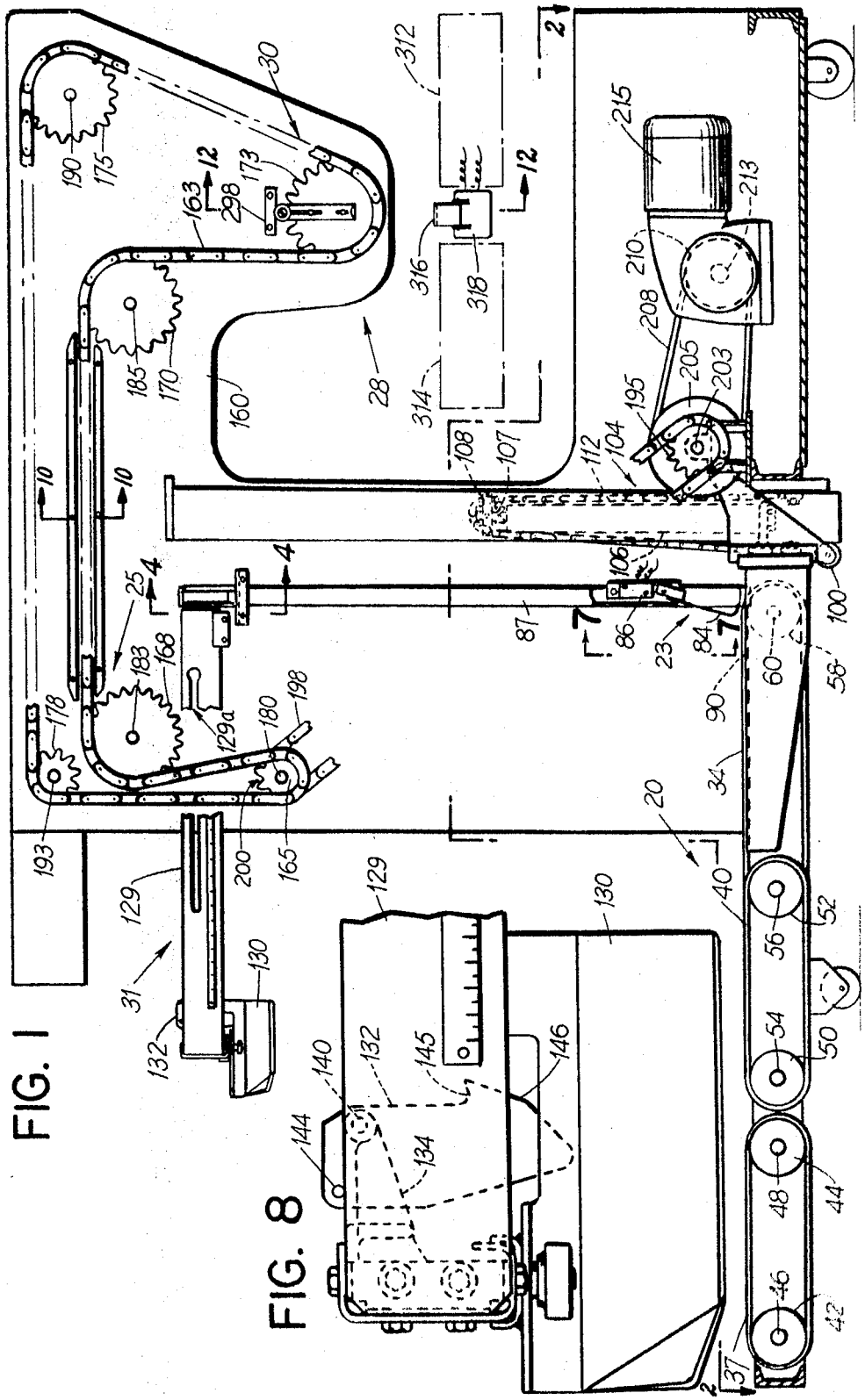
FIG. 1 is a side elevation of apparatus according to the invention with portions thereof broken away.

With reference to the drawings, a preferred embodiment of apparatus incorporating features of the invention may comprise an infeed conveyor assembly 20 for transporting a stack of pans to an elevator assembly 23 which is operable to raise the stack of pans to a position whereat the topmost pan is at a predetermined height, a pan pickup and transporting assembly 25 operable to pick up the topmost pan and deliver it to a pan delivery station 28 whereat a pan release assembly 30 causes the pan to be dropped, means for maintaining the topmost pan at the predetermined height as pans are removed from the stack and a pan accumulator 31 for supporting a predetermined number of pans adjacent the predetermined height when the elevator is withdrawn.

Figure 2:
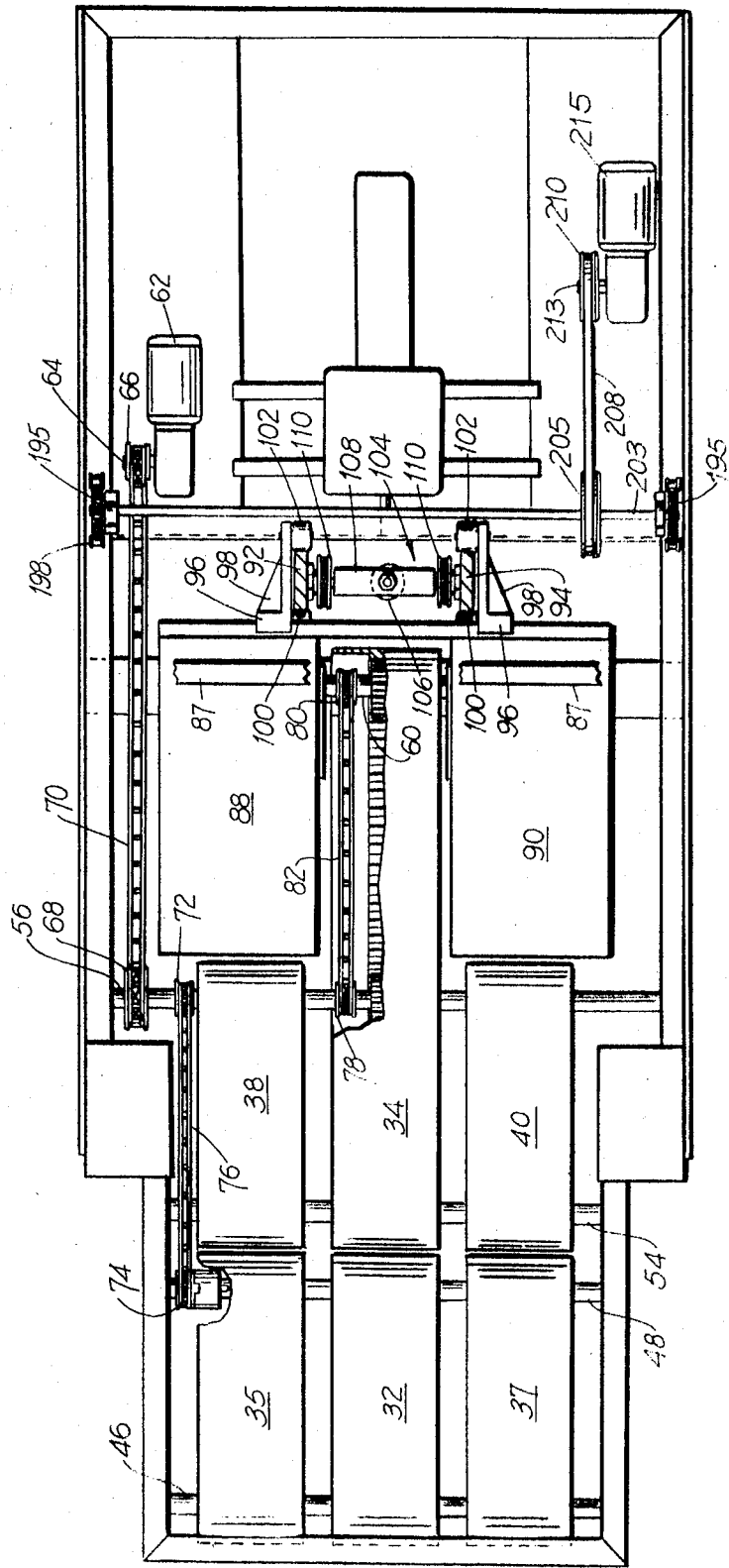
FIG. 2 is a plan view of the apparatus taken from line 2–2 of FIG. 1.

Referring now to FIGS. 1 and 2, infeed conveyor assembly 20 includes a first central conveyor 32 a second central conveyor 34 in line therewith, a first pair of side conveyors, 35 and 37 juxtaposed on either side of the first central conveyor 32 and a second pair of side conveyors 38 and 40 in alignment with side conveyors 35 and 37 respectively. Conveyors 32, 35 and 37 are mounted on separate spaced rollers, 42 and 44, which are mounted on shafts 46 and 48 respectively. Conveyors 38 and 40 are mounted on separate spaced rollers 50 and 52 which are mounted on shafts 54 and 56 respectively. Conveyor 34 is mounted on a roller parallel to roller 50 and a roller 58 spaced therefrom. Roller 58 is mounted on a shaft 60. The conveyors are driven by a motor 62 having an output shaft 64 extending therefrom. A sprocket 66 is mounted on output shaft 64 and a sprocket 68 is mounted on shaft 56 in spaced relationship with sprocket 66. A chain 70 is mounted over sprockets 66 and 68 and transmits the rotary power of the motor to that shaft. Conveyors 38 and 40 driven directly from shaft 56.

The rotary power of shaft 56 is transmitted to shaft 48 to drive conveyors 32, 35 and 37 by a sprocket 72 mounted on shaft 56, a sprocket 74 mounted on shaft 48 in spaced relationship therewith and a chain 76 mounted over the two sprockets. Power is supplied to shaft 60 to drive conveyor 34 by a sprocket 78 mounted on shaft 56, a sprocket 80 mounted on shaft 60 and a chain 82 mounted over these two sprockets. With this arrangement, upon activation of motor 62, a stack of pans placed on conveyors 32, 35 and 37 is advanced to the right as seen in FIG. 1. The conveyors are driven by motor 62 until the leading edge of the stack of pans strikes an actuating lever 84 disposed to actuate a limit switch 86 connected to the motor, thus turning the motor off. The limit switch is mounted in one of two upright frame members 87.

The actuation of limit switch 86 also serves to activate elevator assembly 23. The elevator assembly includes a pair of lifting plates, 88 and 90, one being in alignment with each of the side conveyors 38 and 40, and thus the two lifting plates straddle the rear portion of second central conveyor 34.

Lifting plates 88 and 90 are mounted for vertical movement on vertically extending stanchions, 92 and 94 respectively, by carriage assemblies 96. With particular reference to FIGS. 1 and 2, the carriage assemblies 96 include a bracket 98 mounted on the elevator plate and extending rearward alongside the stanchions and a pair of wheels 100 and 102 mounted on the brackets for engaging the front and rear of the stanchions.

The lifting plates are raised and lowered along stanchions 92 and 94 by a hydraulic drive means 104. The hydraulic drive means includes a hydraulic cylinder 106 having a piston 107 mounted for reciprocating movement therein. A yoke 108 is mounted at the top of the piston and includes a pair of sprockets 110 mounted thereon. A pair of chains 112 are anchored to the bottom of the frame, each passing over a sprocket 112 and anchored at its other end to a carriage 96. As the piston 107 is raised from its position shown in FIG. 1, the position of the chain provides double the equivalent lifting of carriages 96 and thus lifting plates 88 and 90. The same applies when the piston 107 is lowered from a raised position.

Suitable valving, (not shown), operated electrically by the switches described herein controls the action of the hydraulic drive means and thus the movement of the lifting plates up and down.

Referring now to FIGS. 3—6, the elevator assembly raises a stack of pans on lifting plates 88 and 90 until the topmost pan engages an actuating lever 120. The actuating lever is mounted on a camming member 122 pivotally mounted by a pin 123 to the frame. A limit switch 124 is mounted beneath camming member 122 and is positioned such that when the camming member is pivoted by the lifting of actuating lever 120, the limit switch will be actuated thereby.

The limit switch 124 is mounted in a control box 126 mounted between upright frame members 87 by a cross beam 127. The control box 126 includes circuitry connected to the valving of the hydraulic cylinder. The actuating lever 120, camming member 122 and limit switch 124 also operate to control the valving of the hydraulic drive means 104 to maintain the topmost pan in the stack at a predetermined level adjacent the actuating lever 120. When a pan is lifted off the top of the stack by the pan pick up and transporting assembly 25, actuating lever 120 falls to a horizontal position, the level of the next tray. This pivots the camming member 122, causing switch 124 to close. This causes the valving of the hydraulic drive to operate to raise the elevator assembly until the actuating lever is raised to a point where camming member causes the switch 124 to open. This operation repeats as each pan is lifted from the stack.

The supply of pans to the pan pick up and transporting assembly 25 is maintained constant by pan accumulator 31 when the elevator assembly 25 descends to receive a new stack of pans from the infeed conveyor assembly. A switch (not shown) mounted in the path of the elevator assembly causes the elevator assembly to descend when a predetermined number of pans are left in the stack. Referring now to FIGS. 1 and 3—6, a rectangular frame 128 is mounted to upright frame members 87. The actuating lever 120 and camming member 122 are mounted in the rear member of frame 128 and thus the pan accumulator 31 which is mounted in part on frame 128 is adjacent the position of the topmost pans when a stack thereof is elevated. The length of the side members 129 of frame 128 can be varied by adjusting a sleeve, pin and slot arrangement 129a so that the pan accumulator can accommodate different sized pans. A plurality of guide members 130 are mounted on the frame 138 to maintain the stack of pans in a compact vertical arrangement. Guide members 130 are slidable along the frame 128 to accommodate pans of different sizes.

The pan accumulator 31 comprises a plurality of pivotally mounted pan holding member adapted to engage and hold the last few pans of a stack when the elevator lifting plates are withdrawn. A plurality of pan holding members 132 are pivotally mounted by brackets 134 to the front of the rectangular frame 128. The brackets 134 include a yoke portion 136 having a bore 138 therein for supporting a pin 140 on which the pan holding member 132 is pivotally mounted. The brackets include an opening 142 through which the pan holding member 132 extends. A pin 144 is mounted in the top portion of pan holding member 132 and rests on top of bracket 134. The location of pins 140 and 144 gravity biases the pan holding members into their pan engaging position. At that position hook portions 145 of the pan holding members are operable to engage the edges of a single pan or the edges of the bottommost pan of a stack of pans. Each of the pan holding members 132 also include a cam follower surface 146 (FIG. 8) which, when engaged by a rising stack of pans, pivots the pan holding members counterclockwise out of its operable position.

A pan holding member 148 is mounted in each of the upright frame members 87 adjacent the height of rectangular frame 128 by a pivotal mount 149 and extends through a opening 150 in the upright frame member as seen in FIG. 6. The members 148 are biased in a pan supporting position, clockwise as seen in FIG. 6, by a spring 151 mounted on pivotal mount 149. A pan supporting groove 154 is provided at the top of the pan holding members 148 for engaging the edge of a pan when the pan holding member is in its operable position. Groove 154 is at the same height as the hook portions 145 of pan holding members 132.

The edges 156 of the openings 150 limit the counterclockwise movement of the pan gripping members 148 and a pin 157 limits their clockwise movement. The pan gripping members 148 include a cam follower surface 158 shaped and positioned to be engaged by the pans raised thereto by the elevator lifting plates and pivot the pan gripping members 148 outwardly. As the elevator assembly raises a stack of pans into the area defined by rectangular frame 128, the edge of the topmost pans of the stack will engage the cam follower surfaces 146 and 158 of the pan gripping fingers 132 and 146 respectively and cam them outwardly. They will remain in their outward position as the stack of pans continues to rise.

As the pans are lifted in succession from the top of the stack by pan lifting and transporting assembly 25 and the elevator assembly rises due to the operation of switch 124 and actuating lever 120, the pans will be lifted past the cam follower surfaces 146 and 158 and the edges of the bottom pan of the stack of pans will come opposite the hook portion 145 of the pan gripping members 132 and the top of pan gripping members 148.

At this position gravity will pivot members 132 inwardly and spring 152 will pivot members 136 inwardly and the edges of the bottom pan of the stack will be engaged by the hook portions of the pan holding members 132 and the pan supporting groove 154 of the pan holding members 148. The number of pans held by the pan accumulator 31 depends upon the location of the hook portions 145 of the pan holding members 132 and the grooves 154 of the pan holding members 148 with respect to the actuating lever 120.

A switch (not shown) is mounted to the frame opposite the position of the elevator lifting plates 88 and 90 slightly above the level where the pan holding members 132 and 148 are pivoted inwardly to support the bottom of stack of pans. Thus, this switch will be actuated by the elevator assembly after the pan holding members have engaged the bottom of the stack of pans to support them independently of the elevator assembly. The switch is connected to the valving of the hydraulic drive, and the actuation thereof causes the elevator assembly to be lowered down to the level of the infeed conveyor 20 to receive a new stack of pans. When the elevator assembly is descending to receive a new stack of pans and then rising with the new stack of pans to the area of rectangular frame 128, the pans supported adjacent the frame 128 by the pan accumulator 31 provides a supply of pans so that the pan pick up and transporting assembly 25 continues to pick up and deliver pans.

When the new stack of pans being raised by the elevator assembly reaches the area of rectangular frame 128 it cams the pan holding members 132 and 148 outwardly, received the pans still supported by the pan accumulator 31 on the top of the stack and the elevator assembly continues upwardly until stopped by the action of the topmost pan on actuating lever 120 and switch 124.

The pan pick up and transporting assembly 25 is mounted on a pair of spaced, shaped frames 160 and includes an endless conveyor chain 163 mounted on each frame 160. The conveyor chains are mounted over sprockets 165, 168, 170, 173, 175 and 178, which are positioned as shown in FIG. 1. This arrangement provides two up and down vertical runs and two horizontal runs, one in each direction. Hereinafter when referring to the cycle of chains 16, the portions thereof will be designated by the two sprockets at the end points. For example, the lower horizontal run will be designated 168—170.

The sprockets 165, 168, 170, 173, 175 and 178 are rotatably supported, respectively, by short stud shafts 180, 183, 185, 188, 190 and 193 suitably secured in the frames 160.

Each of the conveyor chains is driven by a sprocket 195, through a chain 198 mounted thereover and over a sprocket 200 mounted on stud shaft 180. The sprockets 195 are mounted on a transverse horizontal drive shaft 203. Shaft 203 carries a pulley 205 driven through a belt 208 from a Reeves pulley 210 which is similar in its function to that shown in U.S. Pat. No. 3,058,611, issued to Fred D. Marasso. The Reeves pulley 210 is mounted on a shaft 213 projecting from the housing of a suitable gear reduction motor 215. Since pulley 210 is of the Reeves type, this provides a variable speed control for the conveyor chains 163.

A plurality of bar assemblies 220 are mounted in and between chains 163. Each bar assembly includes a bar 222 mounted at each end thereof to a chain by a mounting subassembly 225. A shaft 228 is mounted in bar 222 through a housing 224 adjacent each end thereof. A plurality of pan gripping fingers 230 are rotatably mounted on each shaft 228 and a plurality of spacer members 233 are mounted on each shaft 228 to space out the several gripping fingers along the shafts.

Each pan gripping finger has a pan gripping hook portion 238 for grasping the edge of a pan, an actuating lever portion 240 and a curved pan engaging edge 242 therebetween. The location of the shaft 228 with respect to the pan gripping fingers mounted thereon provides that the fingers are biased by gravity to a substantially vertical or pan gripping position.

When a bar assembly is driven down run 178—165 of the chains 163, the pan engaging edges 242 strike the edges of the topmost pan of the stack supported adjacent frame 128. As the chain is driven further, the pan engaging edges of the gripping fingers rest on the pan edges, and pivot outwardly as the bar mounting subassemblies are driven around sprocket 165. The bar assembly is maintained upright on the stack of pans during the movement of the mounting subassemblies around sprocket 165 by the pivotal nature of the mounting subassemblies 225. As the chain drives the bar assembly up run 165—168 past the level of the topmost pan, the pan gripping fingers pivot inwardly and engage the hook portions thereof with the edge of the pan and lift the pan upon further upward movement of the bar assembly.

An actuating rod 244 is mounted beneath the distal end of the actuating lever portions 240 of the several pan gripping fingers by a pair of connecting members 245. The actuating rod is mounted between the distal ends of the connecting members 245 and the proximal ends of the connecting members are pivotally mounted to shafts 228.

Figure 10:
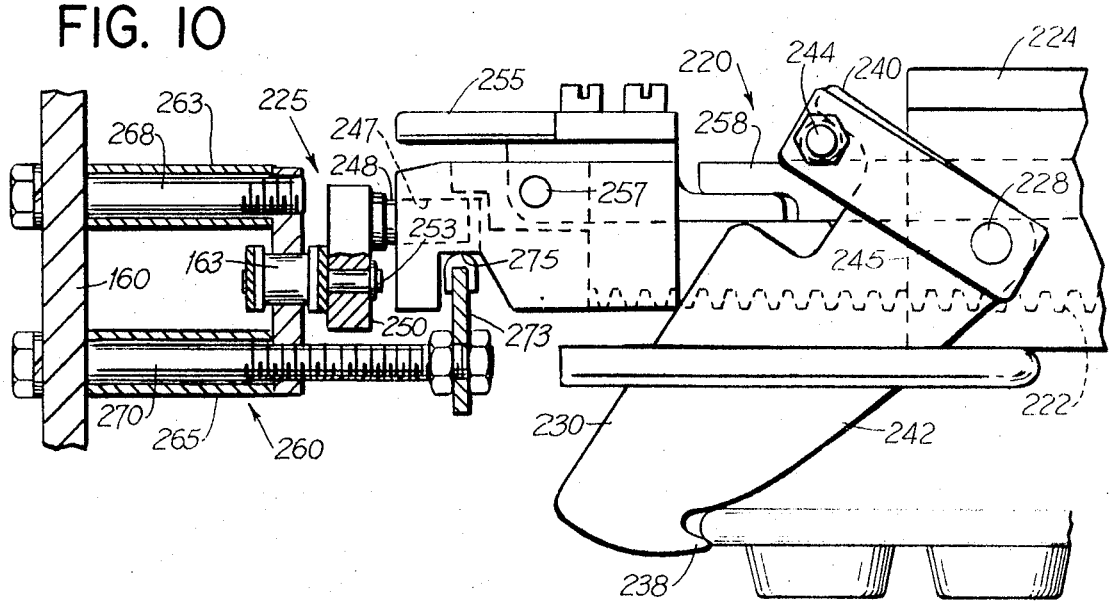
FIG. 10 is a sectional view of the apparatus taken along line 10–10 of FIG. 1.
Figure 12:
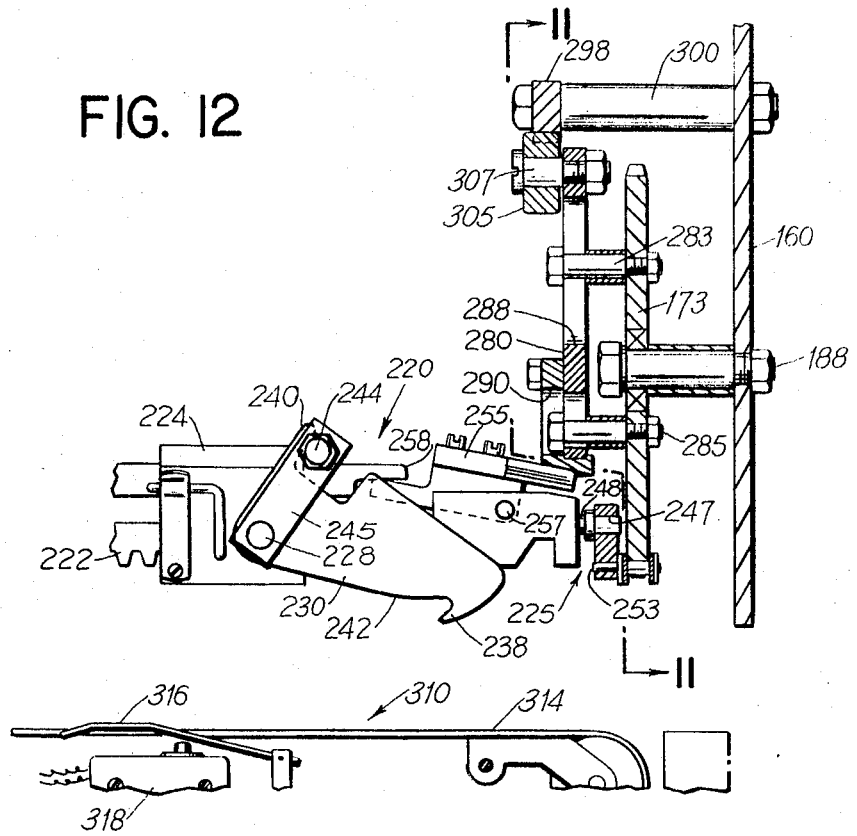
FIG. 12 is a sectional view of the apparatus taken along line 12–12 of FIG. 1.

With reference to FIGS. 10 and 12, the bar mounting subassemblies include a recess 247 for rotatably receiving a spur 248. Spur 248 is mounted in a connecting member 250 which is connected to the chain 163 by a bolt 253. Thus, as the chains 163 are driven from motor 180, the bar assemblies 220 traverse the closed loop path defined thereby.

The bar mounting subassemblies further include a first shaped actuating member 255 pivotally mounted therein by a pin 257. Actuating member 255 is mounted to engage a second pivotally mounted actuating member 258 which in turn is engageable with actuating rod 244.

After the bar assembly completes vertical run 165—168, it is then driven around sprocket 168 to the horizontal run 168—170. Since the bar assembly is carrying the pan it is necessary to maintain the rotatable bar 222 in a stabile condition. Accordingly, a stabilizing assembly 260 is positioned adjacent run 168—170.

With reference to FIG. 10, the stabilizing assembly includes a pair of opposed longitudinally extending bars 263 and 265 that engage chain 163 and maintains it in a horizontal attitude.

Members 263 and 265 are connected to the frame 160 by bolts 268 and 270 respectively. Bolt 270 also supports a stabilizing member 273 which engages a recess 275 in the underside of the bar mounting subassemblies 225 to provide a horizontal support thereof.

The pans are released from the pan gripping fingers at the end of the vertical run 170—173 by the pan release assembly 30.

Figure 11:
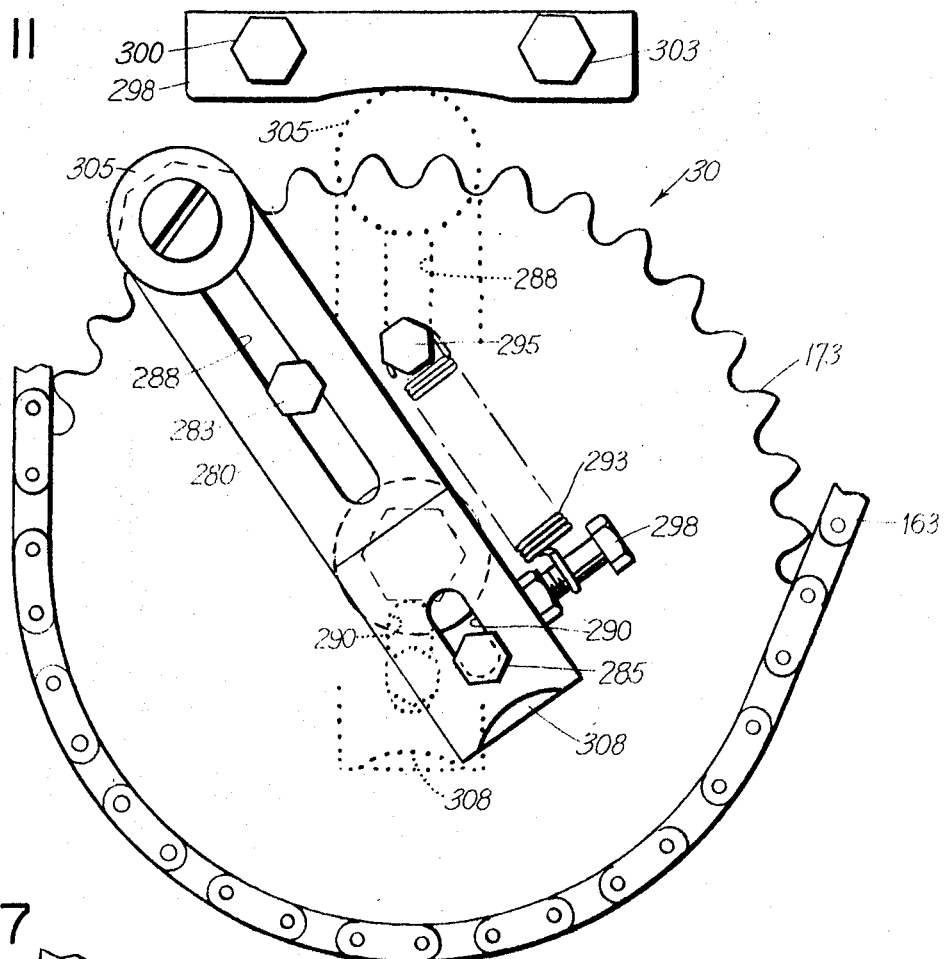
FIG. 11 is a partial elevation view of the apparatus taken along line 11–11 of FIG. 12.
Figure 7:
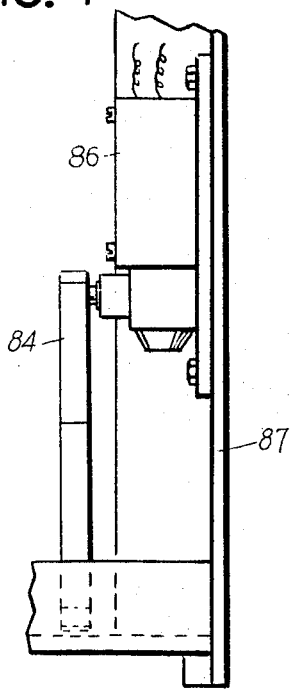
FIG. 7 is a partial elevation view of the apparatus taken along line 7–7 of FIG. 1.
Figure 9:
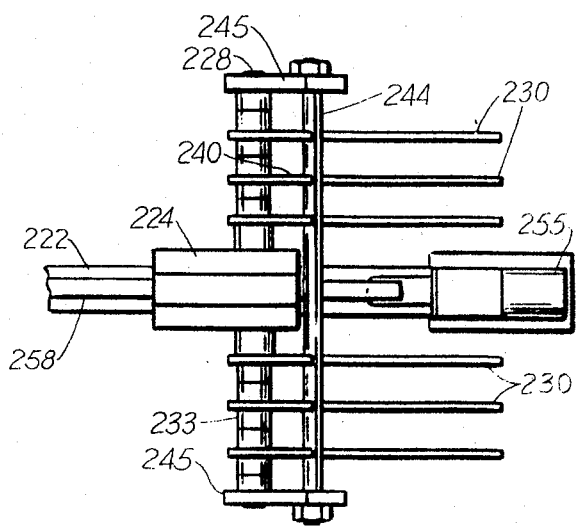
FIG. 9 is a partial plan view of the pan gripping apparatus of the invention.

The pan release assembly 30 includes a pan release actuating member 280 mounted on sprocket 173 by two bolts, 283 and 285 respectively. The bolts connect the pan release actuating members to sprocket 173 through slots 288 and 290 respectively, thus providing a capability for the actuating member 280 to be moved longitudinally along the slots with respect to sprocket 173. A spring 293 mounted between a bolt 295 on the sprocket and bolt 298 on the actuating member 280 biases the latter to the position shown in solid lines on FIG. 11, i.e. the position whereat bolt 285 is at the end of slot 290 removed from spring 293.

A camming member 298 is mounted to frame 160 adjacent the top of sprocket 173 by a pair of bolts 300 and 303. A cam follower 305 is rotatably mounted to actuating member 280 in spaced relationship with camming member 298 by a suitable connector 307.

Actuating member 280 is mounted on sprocket 173 such that cam follower 305 will come into engagement with the camming member 298 as a bar assembly is driven around the bottom of sprocket 173. Therefore, as actuating member 280 approaches a vertical position and is driven downwardly along slots 288 and 290 by camming member 298 the bottom thereof, designated 308, engages one end of actuating member on the mounting subassembly 225. This pivots actuating member 255 around pin 257 and causes the other end thereof to raise actuating member 258.

This in turn brings actuating member 258 into engagement with actuating rod 244 and lifts the latter, pivoting the lever portions 240 of the several gripping fingers inwardly, thus pivoting the pan gripping hooks 238 thereof outwardly to release the pan held thereby.

The bar assembly is then driven through runs 173—175, 175 and 178 and 178—165 to pick up another pan. Of course, several bar assemblies are usually mounted on chains 163.

The bar assemblies are mounted on chains 163 in locations spaced such that they will reach the area adjacent the bottom of sprockets 173 when the bottom 308 of actuating member 280 is in position to engage actuating members 255 of the bar assembly.

The pans released from the apparatus by the pan release mechanism drop substantially vertically. Any suitable collection means may be placed beneath sprocket 173. However, the apparatus is usually utilized in conjunction with a pan filling machine of some type, the infeed conveyor 310 of which is schematically shown in FIG. 1 as being positioned just below sprocket 173. Conveyor 310 includes two spaced conveyor belts 312 and 314 and the actuator 316 of a switch 318 mounted therebetween. Another switch (not shown) is mounted adjacent one of the sprockets 170 in the path of the bar assemblies 220. The combination of this switch and switch 318 form a demand control for the apparatus by controlling motor 215 as follows: When actuator 316 of switch 318 is depressed by a pan, the switch adjacent sprocket 170 is operable to shut down motor 215 when a bar assembly reaches that position and activates the switch. When the pan is moved off actuator 316 by conveyor 310, the motor is turned on again.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. Pan feeding apparatus comprising:
a frame,
means for supporting a stack of pans at a level beneath said frame,
means for raising said support means to a position such that the topmost pan of a stack of pans supported thereon is at a predetermined height, which height is level with said frame, means for successively lifting the topmost pan from the stack and transporting it to a position spaced from a collection area, means for successively raising said stack supporting means after the topmost article has been removed to maintain the topmost pan of the stack at said predetermined height for successive lifting therefrom, and means mounted on said frame for engaging and supporting the last few pans of the stack of pans independently of said stack supporting means.

2. Pan feeding apparatus according to claim 1, further comprising:

a pan release mechanism mounted at said position spaced from a collection area for removing pans from the pan lifting and transporting means.

3. Pan feeding apparatus according to claim 1, wherein said pan lifting and transporting means includes:

a pair of spaced endless chains arranged to provide an up and down substantially vertical run in spaced relationship with the stack of pans, a horizontal run to a position spaced from said pan collection area, an up and down vertical run in spaced relationship with said pan collection area and a horizontal run back to said first named vertical run a plurality of bar assemblies mounted between the endless chains and at spaced intervals and a plurality of pan gripping fingers pivotally mounted on each bar assembly adapted to engage and grip the edges of a pan.

4. Pan feeding apparatus according to claim 1, wherein the pan raising means includes:

a substantially upright support means, a carriage mounted on the upright support means means connecting the carriage to the pan support means, and means for moving the carriage up and down the upright support means.

5. Pan feeding apparatus according to claim 4, wherein the means for moving the carriage up and down the support includes:

a hydraulic cylinder and a chain connected between the hydraulic cylinder and the carriage.

6. Apparatus according to claim 1, wherein said means for engaging the last few pans of the stack includes a plurality of gripping fingers pivotally mounted to the frame and spring biased into engagement with the stack of pans.

7. Pan feeding apparatus comprising:

means for transporting a stack of pans, means for raising said support means to a position whereat the topmost pan is at a predetermined height, means for lifting said topmost pan from the stack and transporting it to a position spaced from a collection area, means for maintaining the topmost pan of the stack at said predetermined height as the pans are removed therefrom, a pan release mechanism mounted at said position spaced from a collection area for removing pans from the lifting and transporting means, said pan lifting and transporting means including a pair of spaced endless chains arranged to provide an up and down substantially vertical run in spaced relationship from said pan collection area, an up and down substantially vertical run in spaced relationship with said pan collection area, and a substantially horizontal run back to said first named substantially vertical run, a plurality of bar assemblies mounted between the endless chains at spaced intervals therealong, a plurality of pan gripping fingers pivotally mounted on each bar assembly adapted to engage and grip the edges of a pan, and means on said bar assemblies for engaging the pan gripping fingers to pivot them outwardly to release pans held thereby.

8. Pan feeding apparatus according to claim 1, wherein:

said pan release mechanisms is mounted adjacent the bottom of the up and down vertical run of the endless chains and includes means for activating said pan gripping fingers engaging means on said bar assemblies to pivot them outwardly.